US009862494B2

United States Patent
Van Lieu et al.

(10) Patent No.: US 9,862,494 B2
(45) Date of Patent: Jan. 9, 2018

(54) FLIGHT DECK TAP OFF FOR MIXER

(71) Applicant: Hamilton Sundstrand Corporation, Windsor Locks, CT (US)

(72) Inventors: Peter Van Lieu, Westfield, MA (US); Matthew William Miller, Enfield, CT (US); Charles J. McColgan, West Granby, CT (US); John Perella, Monson, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 777 days.

(21) Appl. No.: 14/495,927

(22) Filed: Sep. 25, 2014

(65) Prior Publication Data
US 2016/0090183 A1 Mar. 31, 2016

(51) Int. Cl.
*B64D 13/00* (2006.01)
*F24F 13/04* (2006.01)
*B60H 1/00* (2006.01)
*B64D 13/06* (2006.01)

(52) U.S. Cl.
CPC .............. *B64D 13/00* (2013.01); *F24F 13/04* (2013.01); *B60H 1/00564* (2013.01); *B64D 2013/0625* (2013.01)

(58) Field of Classification Search
CPC .. B64D 13/00; B64D 2013/0625; F24F 13/04
See application file for complete search history.

(56) References Cited

U.S. PATENT DOCUMENTS

| 2,586,002 | A | * | 2/1952 | Carson, Jr. | ............. | B64D 13/06 |
|  |  |  |  |  |  | 55/459.1 |
| 3,332,442 | A | * | 7/1967 | Reed | ...................... | B01F 5/045 |
|  |  |  |  |  |  | 137/896 |
| 4,517,813 | A | * | 5/1985 | Eggebrecht | ............ | B64D 13/00 |
|  |  |  |  |  |  | 55/448 |
| 4,742,760 | A | * | 5/1988 | Horstman | ............. | B64D 13/00 |
|  |  |  |  |  |  | 244/118.5 |
| 4,942,739 | A | * | 7/1990 | Uda | ....................... | B64D 13/00 |
|  |  |  |  |  |  | 55/448 |

(Continued)

FOREIGN PATENT DOCUMENTS

GB 671567 A * 5/1952 ............. B64D 13/06

*Primary Examiner* — Alissa Tompkins
*Assistant Examiner* — Frances F Hamilton
(74) *Attorney, Agent, or Firm* — Carlson, Gaskey & Olds, PC

(57) ABSTRACT

A tap off for use in a mixer comprises a pair of cylindrical portions, with a first cylindrical portion extending in a direction that will be inward toward a mixer when the tap off is mounted on a mixer. The first cylindrical portion defines a first port inlet and communicates into a second cylindrical portion. The second cylindrical portion defines a second inlet port and an outlet port for combining air from both the first inlet and the second inlet port. The first and second cylindrical portions are fixed together. A pair of diverter plates have a face for deflecting air from the second inlet port in the inward direction, and further have a leg extending from the face into the first cylindrical portion. Tabs on the face and legs of both diverter plates extend into slots in the second cylindrical portion. The tabs extends into slots in the first cylindrical portion. A mixer, and an ECS pack are also disclosed.

15 Claims, 4 Drawing Sheets

(56) References Cited

U.S. PATENT DOCUMENTS

| | | | |
|---|---|---|---|
| 5,118,053 A | 6/1992 | Singh et al. | |
| 5,516,330 A | 5/1996 | Dechow et al. | |
| 5,655,359 A * | 8/1997 | Campbell | B64D 33/02 |
| | | | 244/58 |
| 5,695,396 A | 12/1997 | Markwart et al. | |
| 5,890,957 A | 4/1999 | Scherer et al. | |
| 6,257,003 B1 | 7/2001 | Hipsky | |
| 6,299,525 B1 | 10/2001 | Scheffler et al. | |
| 6,942,183 B2 | 9/2005 | Zywiak | |
| 6,984,170 B2 * | 1/2006 | Schlecht | B60H 1/00028 |
| | | | 165/41 |
| 7,322,202 B2 | 1/2008 | Zywiak et al. | |
| 7,779,644 B2 | 8/2010 | Decrisantis et al. | |
| 7,871,038 B2 * | 1/2011 | Space | B64D 13/06 |
| | | | 244/118.5 |
| 9,511,868 B2 * | 12/2016 | Stengel | B64D 13/00 |
| 2004/0231350 A1 * | 11/2004 | Kline | B64D 13/00 |
| | | | 62/244 |
| 2005/0061913 A1 * | 3/2005 | McColgan | B64D 13/00 |
| | | | 244/118.5 |
| 2008/0279041 A1 * | 11/2008 | Winkler | B01F 5/0611 |
| | | | 366/338 |
| 2009/0165878 A1 * | 7/2009 | Krakowski | B01F 3/02 |
| | | | 137/896 |
| 2010/0047013 A1 * | 2/2010 | Hofmann | B64D 13/00 |
| | | | 403/336 |
| 2010/0173576 A1 * | 7/2010 | Schmid | B64D 13/08 |
| | | | 454/75 |
| 2015/0021006 A1 * | 1/2015 | Vue | B64D 13/08 |
| | | | 165/263 |
| 2016/0377316 A1 * | 12/2016 | Ellsworth | F24F 13/222 |
| | | | 62/285 |

* cited by examiner

FLIGHT DECK TAP OFF FOR MIXER

BACKGROUND OF THE INVENTION

This application relates to a flight deck tap off included in a mixer utilized to mix plural airflow sources and supply air to various uses on an aircraft.

Aircraft require conditioned air for any number of purposes. As one example, air must be supplied into a passenger cabin.

Complex machines, known as air cycle machines, take in ambient air and condition that air such that it may be utilized in a passenger cabin. In addition, it is known to recirculate air from the cabin. The airflow from the air cycle machine is mixed with the recycled air in a mixer.

In addition, air must be supplied to the flight deck without any recirculated air. Thus, a so-called tap off taps the unmixed air from the mixer and delivers it to the flight deck or cockpit.

The known tap offs have a generally T-construction with a tap leg, a leg to deliver the air to the flight deck and a leg to receive hot air to mix with the tapped air.

Also, within the tap off, there are diverter plates which are utilized to drive the hot air towards the tap leg to minimize icing. The known tap off has generally been formed with two clamshell halves forming a portion of the top of the T, and three tube portions forming the legs of the T. In addition, diverter plates were simply welded within the structure.

Known tap offs are complex to manufacture and result in a relatively high amount of waste.

SUMMARY OF THE INVENTION

A tap off for use in a mixer comprises a pair of cylindrical portions, with a first cylindrical portion extending in a direction that will be inward toward a mixer when the tap off is mounted on a mixer. The first cylindrical portion defines a first port inlet and communicates into a second cylindrical portion. The second cylindrical portion defines a second inlet port and an outlet port for combining air from both the first inlet and the second inlet port. The first and second cylindrical portions are fixed together. A pair of diverter plates have a face for deflecting air from the second inlet port in the inward direction, and further have a leg extending from the face into the first cylindrical portion. Tabs on the face and legs of both diverter plates extend into slots in the second cylindrical portion. The tabs extends into slots in the first cylindrical portion. A mixer, an air pack and a method are also disclosed.

These and other features may be best understood from the following drawings and specification.

DETAILED DESCRIPTION

Figure 1A:
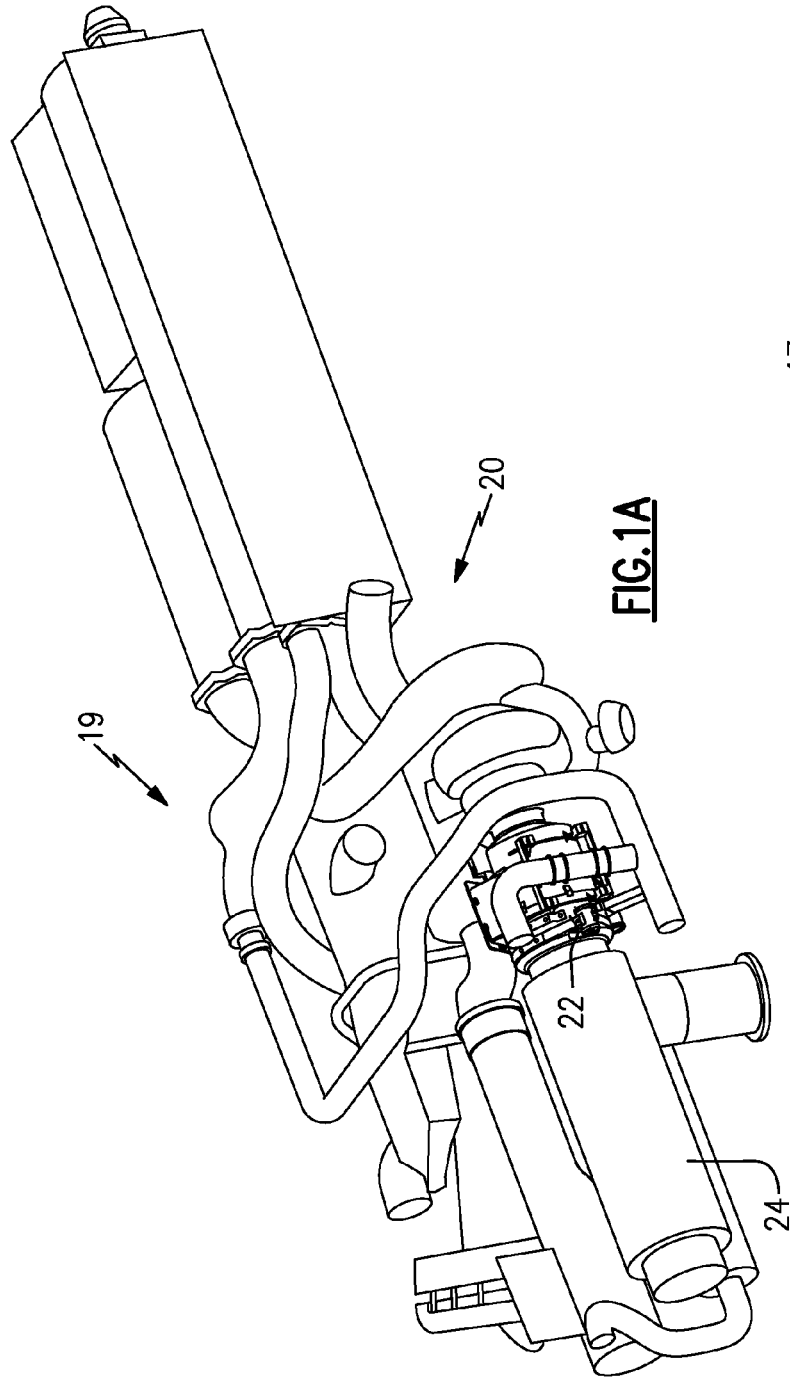
FIG. 1A schematically shows an air supply path for use in an aircraft.

FIG. 1A shows an environmental control system (ECS) pack 19, which may be utilized on an aircraft. ECS pack includes an air cycle machine 20 takes in ambient air and compresses and expands it thus changing its pressure and temperature. In combination with heat exchangers (not shown) the ambient air is heated and pressurized to a temperature and pressure such that it can be circulated to a passenger cabin and to the flight deck.

The air cycle machine 20 typically includes a fan for delivering air to a mixer 22. The mixer 22 mixes plural sources of air and passes it downstream into a cabin air supply duct 24.

Figure 1B:
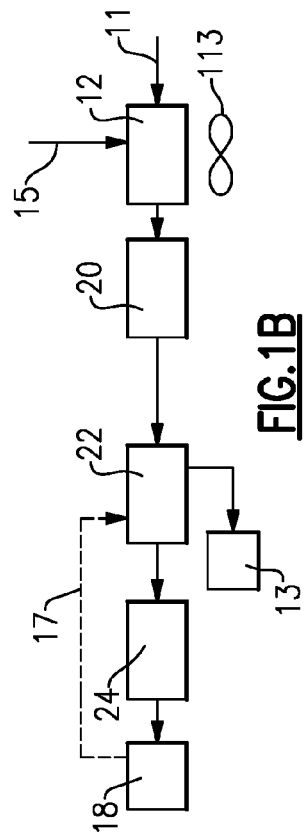
FIG. 1B is a schematic of airflow.

FIG. 1B schematically shows the duct 24 delivering air into a cabin 18. Recirculating air shown at 17 is also sent back to the mixer 22. The air cycle machine 20 receives hot air 11, such as from a compressor in a gas turbine engine. Ambient air 15 is driven by a fan 113 and across a heat exchanger 12 for conditioning the air 11. Also, air flows from the mixer 22 to a flight deck 13. The air delivered to the flight deck 13 is also mixed with hot air, which may be from the hot air source 11.

Figure 2:
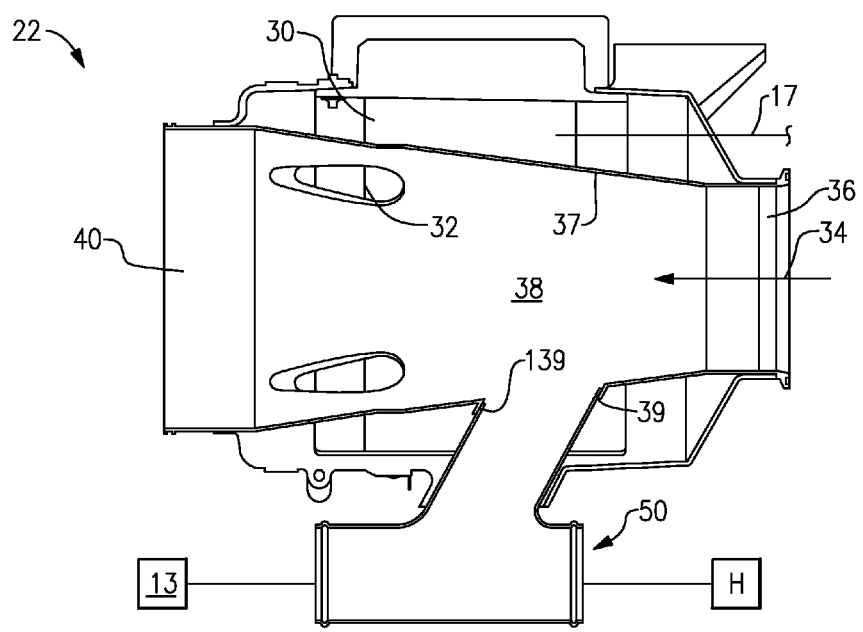
FIG. 2 is a cross-section through a mixer.

As shown in FIG. 2, the mixer 22 includes a duct 30 for receiving the recirculated air 17 (shown schematically) from the cabin. The mixer also delivers air to the flight deck or flight deck 13 through an outlet 39 and a tap off 50. As can be appreciated from FIG. 2, the air 34 supplied to the mixer from the air cycle machine 20 enters an inlet 36 and passes to a chamber 38 defined by an inner housing 37. Air from chamber 38 is diverted such that a portion of the air flows through the outlet 39 to the tap off 50 and then to the flight deck 13. This occurs prior to the recirculated air 17 being mixed into chamber 38 through openings 32.

The recirculated air passes through ports 32 downstream of the outlet 39 such that the oxygen poor recirculated air is not sent to the flight deck 13. Outlet 39 communicates to an opening 139 in tap off 50. An outlet 40 is axially downstream of inlet 36 and leads to the duct 24. Thus, both air 34 from the air cycle machine and recirculated air 17 are mixed in the mixer 22.

Figure 3A:
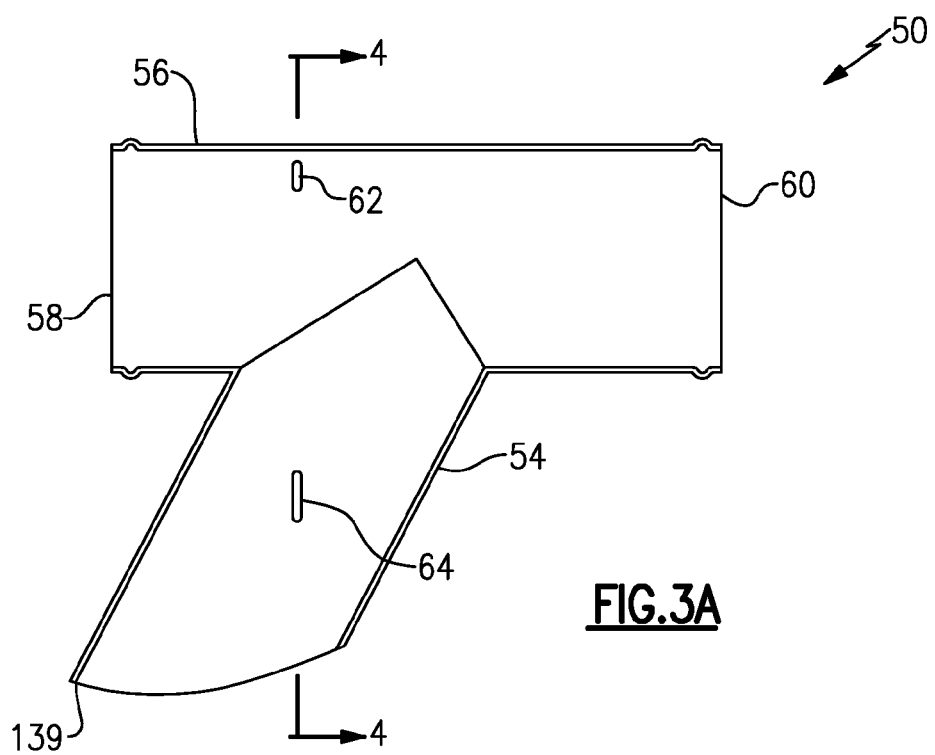
FIG. 3A shows a tap off.

FIG. 3A shows the tap off 50. As can be appreciated, the tap off 50 has three legs with an inlet 139 defined at a bottom leg, an inlet 58 receiving the hot air source H, and an outlet 60 to be connected to the flight deck 13. The tap off 50 has its ports formed of two members. A first cylindrical tube 54 defines the bottom leg and opening 139. Second, cylindrical tube 56 defines the ports 58 and 60.

Figure 3B:
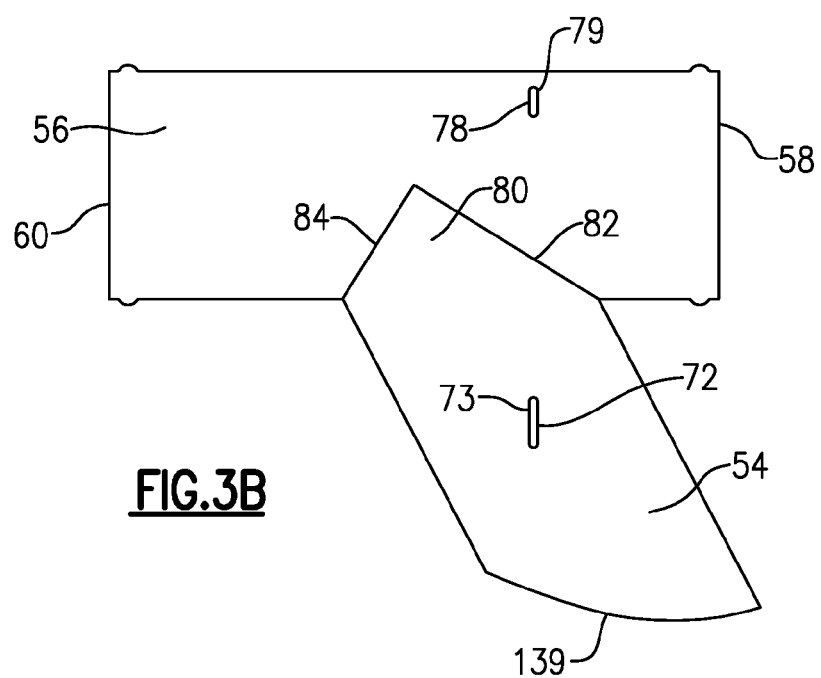
FIG. 3B is the outside of the tap off.

As shown in FIG. 3B, the tube 54 has a fish mouth shape 80 with sides 82 and 84 extending upwardly and welded or otherwise connected to the tube 56. As can be appreciated, the cylindrical tube 56 is cut away at the area of the side pieces 82 and 84, such that there is unobstructed flow between the inlet 39 and the outlet 60.

Figure 3C:
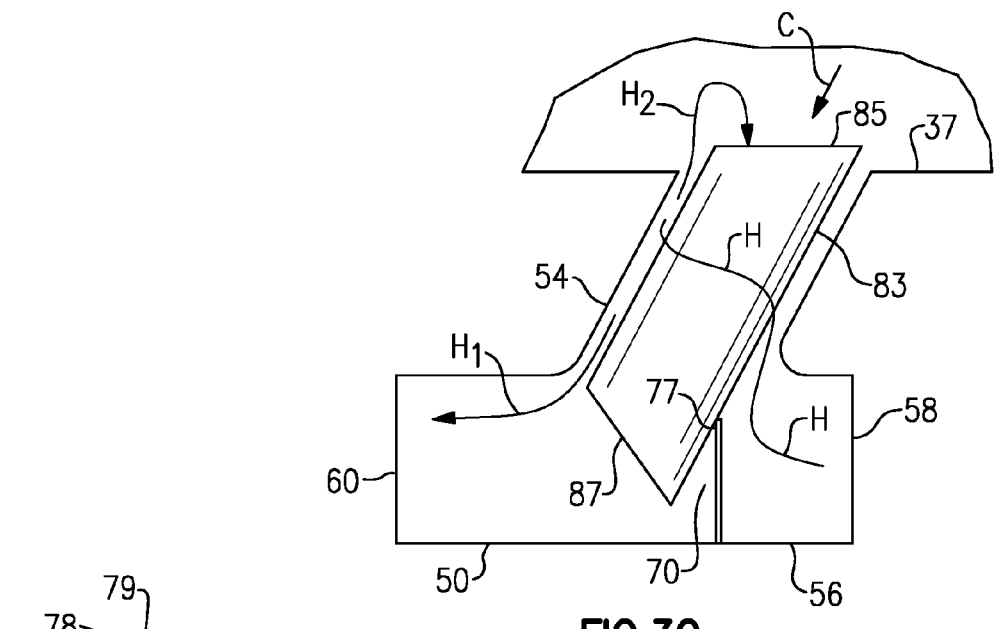
FIG. 3C schematically shows the airflow in the area of the tap off.

FIG. 3C shows the actual air flow path in tap off 50. As shown, hot air H is diverted into tube 54 and swirls around an outer periphery of a slash pipe 83. The air flows in a cavity inward of tube 54 and outward of slash pipe 83. The size of this cavity, as illustrated, may be somewhat exaggerated to show the cavity. Slash pipe 83 has an inlet 85 which receives a portion (C) of air flow 34. Some of the hot air ($H_1$) flows from the cavity back into tube 56. Another portion of the hot air ($H_2$) flows along the length of slash pipe 83, and into inlet 85. Air flows $H_2$ and C mix and flow to an outlet 87 of slash pipe 83, and then mix with air flow $H_1$.

Figure 4:
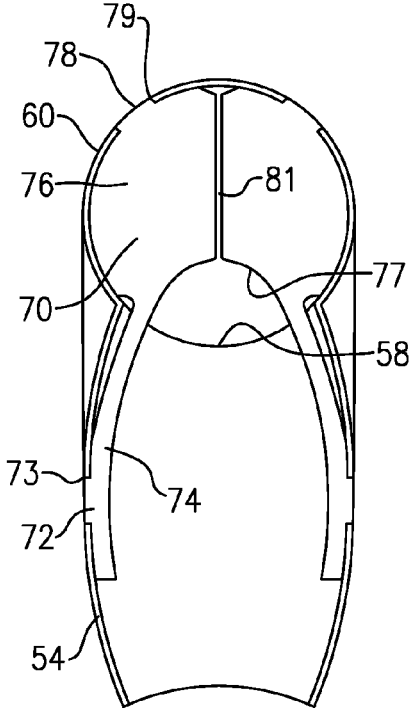
FIG. 4 is a cross-sectional along 4-4.

As shown in FIG. 4, diverter plates 70 are positioned internally and have a diverter face 76 diverting the hot air from source H inwardly into the cavity between the tube 54 and the slash pipe. This forces the hot air from the port 58 downwardly such that it serves to de-ice the bottom leg in tube 54. As also shown, a gap 81 exists between faces 76. As mentioned, in the past, diverter plates were simply welded within the clam shells and tube portions.

The diverter plates 70 have tab structure that properly positions them within the cylindrical portions 54 and 56. Thus, face 76 is shown to have a tab 78 extending through slots 79 in the tube 56. A leg 74 extends inwardly from the face 76. Tabs 72 are formed on the legs and extend through slot 73 in the tubular portion 54. Thus, the diverter plates 70 are properly positioned within the tube portions 54 and 56. This reduces the complexity of assembly compared to the prior art and further reduces scrap.

In addition to reducing the complexity of the assembly and reducing scrap, the tabs and slots reduce misalignment by providing a positive locating feature for plates 70 and holding them in position during welding. Proper positioning of these plates is valuable for performance and assembly fit-up. Welding can cause the material to shrink and warp and move out of position. The disclosed arrangement assists in maintaining proper positioning.

Figure 5:
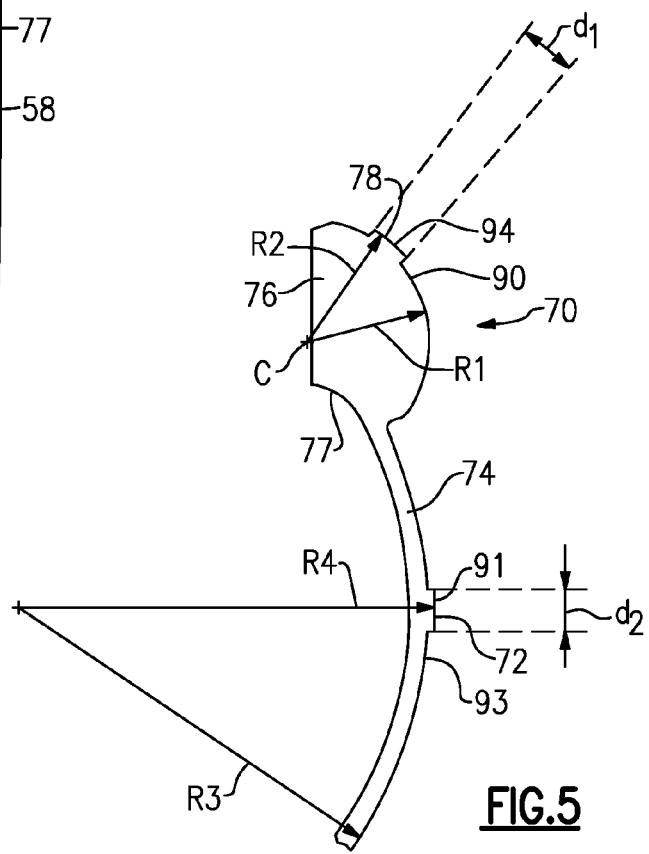
FIG. 5 shows a detail of the tap off.

FIG. 5 shows details of the diverter plate 70. The leg 74 extends from the face 76. As mentioned above, t inner bore 77 receives the slash pipe once assembled.

The tab 78 can be seen to extend along a flat face 94 for a distance $d_1$. The tab 72 has its flat face 91 extending for a distance $d_2$.

The distance from a center point of the curved outer surface 90 of the face 76 is shown as a radius $R_1$ from a center point C. A radius $R_2$ is defined to the outer surface 94 of the tab 78. In one embodiment $R_1$ was 1.435 inch (3.6449 centimeters) and $R_2$ was 1.525 inch (3.8735 centimeters). In embodiments, a ratio of $R_2$ to $R_1$ is between 1.107 and 1.020.

A radius $R_3$ is defined to the outer surface 93 of the leg 74 and a radius $R_4$ is defined to the outer face 91 of the tab 72. In one embodiment $R_3$ was 4.600 inch (11.7 centimeters) and $R_4$ was 4.900 inch (12.4 centimeters). In embodiments, a ratio of $R_4$ to $R_3$ was between 1.079 and 1.051. In embodiments, $d_1$ and $d_2$ are both 0.500 inch (1.27 centimeters). In embodiments, a ratio of $d_1$ to $R_2$ was between 0.375 and 0.282. A ratio of $d_2$ to $R_4$ is between 0.115 and 0.089.

The tap off as disclosed is easier to assemble than the prior art and results in dramatic reduction in scrappage.

A method of replacing a tap off in a mixer according to this disclosure includes the steps of providing a mixer 22 having an outer housing 30 for receiving recycled air, and an inner housing for receiving a fresh air source. A tap off 50 has a bottom leg 54 for tapping off a portion of the fresh air from the inner housing. The method removes the tap off 50 and inserts a new tap off 50.

The replacement tap off 50 has a pair of cylindrical portions 54 and 56. A first cylindrical portion 54 extends in a direction that will be inward toward a mixer when the tap off is mounted on a mixer. The first cylindrical portion defines a first inlet port 139 and communicates into a second cylindrical portion 56, with the second cylindrical portion defining a second inlet port 58 and an outlet port 60 for combining air from both the first and second inlet ports. The first and second cylindrical portions are fixed together. A pair of diverter plates have a face 76 for deflecting air from the second inlet port in the inward direction. The diverter plates further have a leg 74 extending from the face into the first cylindrical portion. Tabs 72/78 are formed on the face and legs of both diverter plates. Tabs on the face extend into slots 79 in the second cylindrical portion 56. Tabs 72 on the legs extend into slots 73 into first cylindrical portion 54.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A flight deck tap off for a mixer, the tap off comprising:
a pair of cylindrical portions, with a first cylindrical portion extending in a direction that will be inward toward a mixer when the tap off is mounted on a mixer, and said first cylindrical portion defining a first inlet port and communicating into a second cylindrical portion, with the second cylindrical portion defining a second inlet port and an outlet port for combining air from both said first inlet port and said second inlet port, and said first and second cylindrical portions being fixed together; and
a pair of diverter plates, with said diverter plates having a face for deflecting air from said second inlet port in the inward direction, and said diverter plates further having a leg extending from said face into said first cylindrical portion, and tabs on said face and said legs of both said diverter plates, with said tabs on said face extending into slots in said second cylindrical portion and said tabs on said legs extending into slots into said first cylindrical portion.

2. The flight deck tap off as set forth in claim 1, wherein said face has an outer surface at locations spaced from said tab and defining a first radius from a center point and said tab extending from a center point by a second radius, and a ratio of said second radius to said first radius being between 1.107 and 1.020.

3. The flight deck tap off as set forth in claim 1, wherein said leg having a nominal outer surface at locations spaced from said tab, and defining a third radius, and said tab extending to a fourth radius, with a ratio of said fourth radius to said third radius being between 1.079 and 1.051.

4. The flight deck tap off as set forth in claim 1, wherein said tab on said face having a flat outer surface extending for a first distance and a ratio of said first distance to said second radius being between 0.375 and 0.282.

5. The flight deck tap off as set forth in claim 4, wherein said tab on said leg extend having a flat outer face extending for a second distance, and a ratio of said second distance to said fourth radius being between 0.115 and 0.089.

6. A flight deck tap off mixer for use on an aircraft comprising:
an outer housing for receiving recycled air, and an inner housing for receiving a fresh air source, and a tap off having a bottom leg for tapping off a portion of the fresh air from said inner housing; and
the tap off including a pair of cylindrical portions, with a first cylindrical portion extending in a direction that will be inward toward a mixer when the tap off is mounted on a mixer, and said first cylindrical portion defining a first inlet port and communicating into a second cylindrical portion, with the second cylindrical portion defining a second inlet port and an outlet port for combining air from both said first inlet port and said second inlet port, and said first and second cylindrical portions being fixed together, and a pair of diverter plates, with said diverter plates having a face for deflecting air from said second inlet port in the inward direction, and said diverter plates further having a leg extending from said face into said first cylindrical portion, and tabs on said face and said legs of both said diverter plates, with said tabs on said face extending into slots in said second cylindrical portion and said tabs on said legs extending into slots into said first cylindrical portion.

7. The flight deck tap off mixer as set forth in claim 6, wherein said face has an outer surface at locations spaced from said tab and defining a first radius from a center point and said tab extending from a center point by a second radius, and a ratio of said second radius to said first radius being between 1.107 and 1.020.

8. The flight deck tap off mixer as set forth in claim 6, wherein said leg having a nominal outer surface at locations spaced from said tab, and defining a third radius, and said tab extending to a fourth radius, with a ratio of said fourth radius to said third radius being between 1.079 and 1.051.

9. The flight deck tap off mixer as set forth in claim 6, wherein said tab on said face having a flat outer surface extending for a first distance and a ratio of said first distance to said second radius being between 0.375 and 0.282.

10. The flight deck tap off mixer as set forth in claim 9, wherein said tab on said leg extend having a flat outer face extending for a second distance, and a ratio of said second distance to said fourth radius being between 0.115 and 0.089.

11. An ECS pack having a flight deck tap off mixer for an aircraft comprising:
   an air cycle machine communicating a fresh air source into a mixer, the mixer including an outer housing for receiving recycled air, and an inner housing for receiving a fresh air source, and a tap off having a bottom leg for tapping off a portion of the fresh air from said inner housing;
   the tap off including a pair of cylindrical portions, with a first cylindrical portion extending in a direction that will be inward toward a mixer when the tap off is mounted on a mixer, and said first cylindrical portion defining a first inlet port and communicating into a second cylindrical portion, with the second cylindrical portion defining a second inlet port and an outlet port for combining air from both said first inlet port and said second inlet port, and said first and second cylindrical portions being fixed together, and a pair of diverter plates, with said diverter plates having a face for deflecting air from said second inlet port in the inward direction, and said diverter plates further having a leg extending from said face into said first cylindrical portion, and tabs on said face and said legs of both said diverter plates, with said tabs on said face extending into slots in said second cylindrical portion and said tabs on said legs extending into slots into said first cylindrical portion.

12. The ECS pack as set forth in claim 11, wherein said face has an outer surface at locations spaced from said tab and defining a first radius from a center point and said tab extending from a center point by a second radius, and a ratio of said second radius to said first radius being between 1.107 and 1.020.

13. The ECS pack as set forth in claim 11, wherein said leg having a nominal outer surface at locations spaced from said tab, and defining a third radius, and said tab extending to a fourth radius, with a ratio of said fourth radius to said third radius being between 1.079 and 1.051.

14. The ECS pack as set forth in claim 11, wherein said tab on said face having a flat outer surface extending for a first distance and a ratio of said first distance to said second radius being between 0.375 and 0.282.

15. The ECS pack as set forth in claim 14, wherein said tab on said leg extend having a flat outer face extending for a second distance, and a ratio of said second distance to said fourth radius being between 0.115 and 0.089.

* * * * *